US008935562B2

(12) United States Patent
Paulson (10) Patent No.: US 8,935,562 B2
(45) Date of Patent: Jan. 13, 2015

(54) FAILOVER OF INTERRELATED SERVICES ON MULTIPLE DEVICES (75) Inventor: Eric M. Paulson, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 311 days.

(21) Appl. No.: 13/487,733

(22) Filed: Jun. 4, 2012

(65) Prior Publication Data

US 2013/0326261 A1 Dec. 5, 2013

(51) Int. Cl.
*G06F 11/00* (2006.01)

(52) U.S. Cl.
USPC ........................................................ 714/4.11

(58) Field of Classification Search
CPC . G06F 11/20; G06F 11/2023; G06F 11/2028; G06F 11/203; G06F 11/2038
USPC ........................................................ 714/4.11
See application file for complete search history.

(56) References Cited

U.S. PATENT DOCUMENTS

| 7,149,303 | B1* | 12/2006 | Laurinavichus | 379/265.01 |
|---|---|---|---|---|
| 8,689,045 | B2* | 4/2014 | Morris et al. | 714/15 |
| 8,726,067 | B1* | 5/2014 | van der Goot | 714/4.11 |
| 2004/0117687 | A1* | 6/2004 | Smith | 714/13 |
| 2007/0036331 | A1* | 2/2007 | Fitzgerald | 379/265.02 |
| 2007/0168693 | A1* | 7/2007 | Pittman | 714/4 |
| 2007/0223446 | A1* | 9/2007 | McMenamy et al. | 370/351 |
| 2009/0094425 | A1* | 4/2009 | Winokur | 711/161 |
| 2010/0042673 | A1* | 2/2010 | Dayley | 709/203 |
| 2011/0010560 | A1* | 1/2011 | Etchegoyen | 713/189 |
| 2011/0299387 | A1* | 12/2011 | Eydelman et al. | 370/225 |
| 2013/0326261 | A1* | 12/2013 | Paulson | 714/4.11 |

* cited by examiner

*Primary Examiner* — Joshua Lohn (57) ABSTRACT

A device may include a network interface for communicating with a failover device, a memory for instructions, and a processor for executing the instructions. The processor may execute the instructions to communicate with the failover device, via the network interface, to fail over the device to the failover device in a cluster by pushing a process on the device to the failover device when a first failover event occurs. The failover device is configured to fail over the device to the failover device by pulling the process on the device on the second device when a second failover event occurs. The device is in the cluster.

20 Claims, 10 Drawing Sheets

Figure 1:
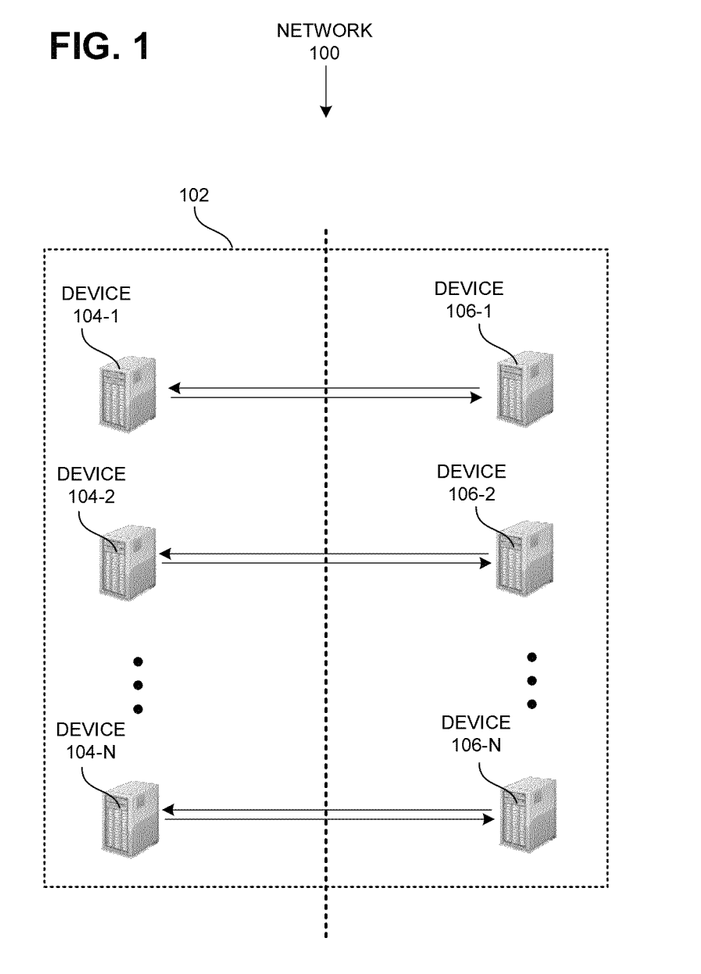
FIG. 1 illustrates concepts described herein.

and 104-N (collectively referred to as "devices 104" and individually as "device 104"). Devices 104 may provide for a set of interdependent applications, processes, and/or services that must failover as a whole. Cluster 102 further includes devices 106-1, 106-2, ... and 106-N (collectively referred to as "devices 106" and individually as "device 106"). Devices 104-1, 104-2, ... and 104-N may fail over to 106-1, 106-2, ... and 106-N, respectively. Conversely, devices 106-1, 106-2, ... and 106-N may fail over to devices 104-1, 104-2, ... and 104-N, respectively.

FAILOVER OF INTERRELATED SERVICES ON MULTIPLE DEVICES

BACKGROUND

When a user calls a call center, a call routing system that handles incoming calls may attempt to connect the user to one of multiple agents attending the call center. However, the attempt to connect to the agent may fail for a variety of reasons. For example, the call may be forwarded to a non-existing business group, the attempt to extend the call may be blocked, a server receiving the call may fail (e.g., when the call is voice-over-Internet Protocol (VoIP), etc.). In some instances, devices of the routing system may failover to other devices of the system. Because of the important business value of the calls, a failed component in the call routing system should not result in extended period of failed routing.

DETAILED DESCRIPTION

The following detailed description refers to the accompanying drawings. The same reference numbers in different drawings may identify the same or similar elements. As used herein, the term "failover" may refer to replacing services provided via one set of processes or applications on a given device to similar/identical services or applications provided via a corresponding set of processes on another device. "Shutting down" a device may be a manual or an automatic process initiated by a failover event.

As used herein, the term "device" may not only include hardware, but may also refer to software (e.g., applications) and/or a combination of hardware and software.

As described below, a system may provide for a failover of a group of multiple devices in a cluster. The multiple devices may provide for one or more interdependent application service(s) that must failover as a whole. Each of the devices may initiate a cluster failover under different scenarios. For example, in one scenario, a process running on one of the devices may fail. In another scenario, a device may be brought down by a network administrator. In each of these instances, any one of the devices in the cluster may initiate a cluster failover for the group of devices.

In failing over the cluster, each of the devices in the cluster may sequence one or more device failovers and may control the timing of the failovers. Without the correct sequencing and/or timing, the failover of the group of devices may not be performed correctly.

FIG. 1 illustrates an exemplary network 100 in which concepts described here may be implemented. As shown, network 100 includes a cluster 102, which in turn, includes devices 104-1, 104-2, ... and 104-N (collectively referred to as "devices 104" and individually as "device 104"). Devices 104 may provide for a set of interdependent applications, processes, and/or services that must failover as a whole. Cluster 102 further includes devices 106-1, 106-2, ... and 106-N (collectively referred to as "devices 106" and individually as "device 106"). Devices 104-1, 104-2, ... and 104-N may fail over to 106-1, 106-2, ... and 106-N, respectively. Conversely, devices 106-1, 106-2, ... and 106-N may fail over to devices 104-1, 104-2, ... and 104-N, respectively.

Because devices 104 host interdependent processes, a failure of any of devices 104-1 through 104-N (e.g., 104-5) needs to initiate a failover sequence for all of other devices 104 (e.g., devices 104-1 through 104-4 and 104-6 through 104-N). In such network configurations, the order of failover of devices may be important. For example, assume that for device 104-2 to fail over correctly to 106-2, device 104-1 has to have already failed over to 106-1. In this situation, correct failover of device 104-2 can be ensured, provided that each of devices 104 and 106 includes a failover script for cluster 102. Each of such failover scripts needs to specify the order in which devices 104-1, 104-2, ... and 104-N fail over to devices 106-1, 106-2, ... and 106-N. Furthermore, the failover scripts have the following property: during a failover of devices 104, executing a script on one device (e.g., 104-5) to bring up a specific device (e.g., device 104-4) at a given time has the same effect as executing another script, on a different device (e.g., device 104-3), to bring up the same device (e.g., 104-4) at a different time.

Figure 2:
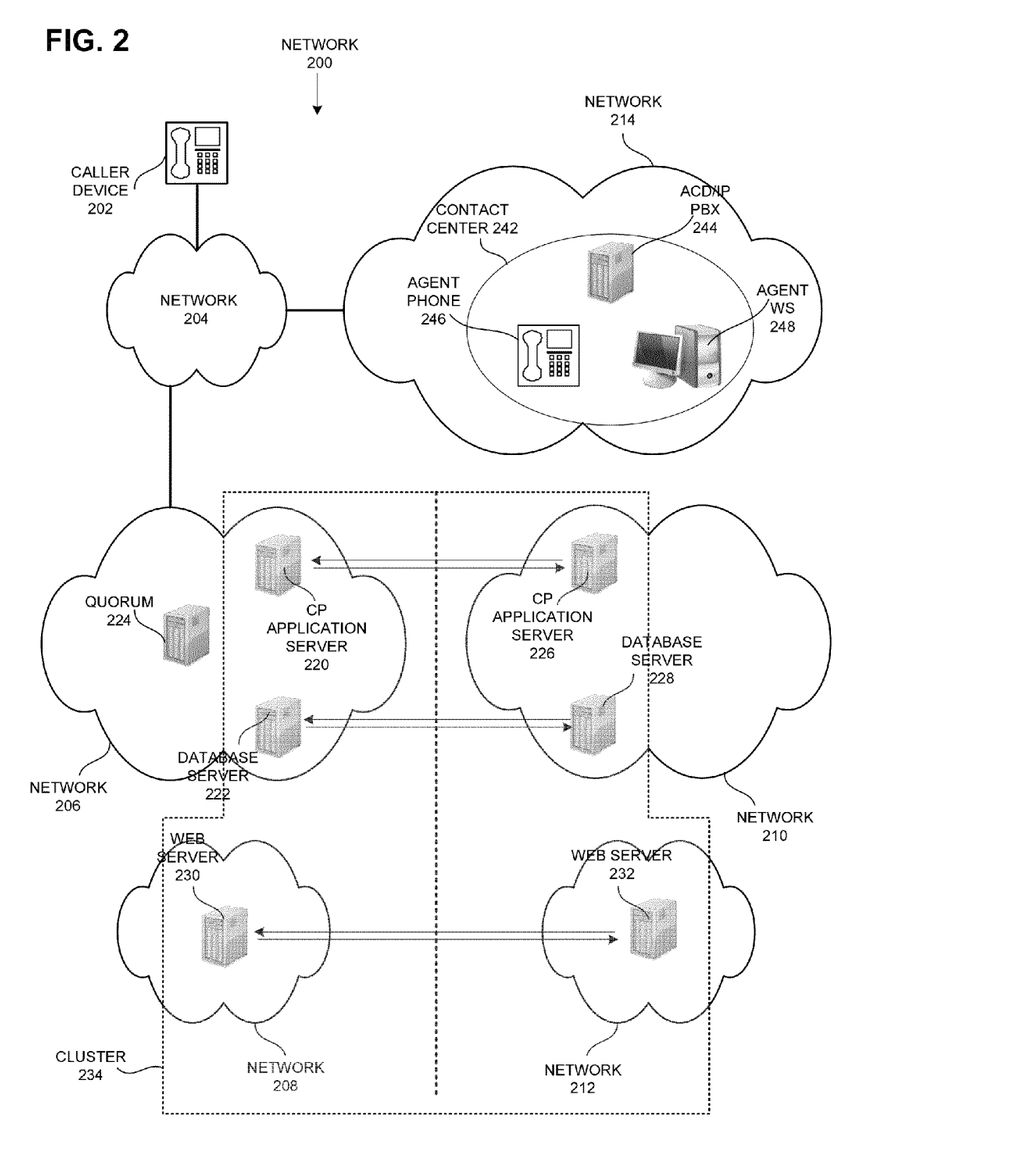
FIG. 2 illustrates an exemplary network in which the concepts described herein may be implemented.

FIG. 2 illustrates an exemplary network 200 in which the concepts described herein may be implemented. As shown, network 200 includes a caller device 202 and networks 204-212, and customer network 214.

Caller device 202 may call a contact center in customer network 214. For example, caller device 202 may call the contact center to receive customer service, access information, purchase a product or a service, etc. Caller device 202 may provide for plain old telephone system (POTS) communications, Session Initiation Protocol (SIP) communications, H.323 communications, etc. These communications may be provided for different types of calls, such as videoconference calls, videophone calls, text messaging sessions, Voice-over-Internet Protocol (VoIP) calls, POTS calls, etc.

Network 204 may include one or more public switched telephone networks (PSTNs) or another type of switched network (e.g., IP network). Network 204 may include a number of transmission towers for receiving wireless signals and forwarding the signals toward the intended destination. Network 204 may further include one or more packet switched networks, such as a local area network (LAN), a wide area network (WAN), a personal area network (PAN), an intranet, the Internet, or another type of network (e.g., a satellite-based network) that is capable of exchanging information.

Networks 206-212 may include one or more PSTN or IP networks. In one implementation, networks 206-212 may be part of a provider network (e.g., a network that provides a service to customer network 214). For example, network 206 may represent a network at a specific locale, network 208 may represent a demilitarized zone (DMZ) network, etc.

As further shown in FIG. 2, network 206 may include a call processing (CP) application server device 220, a database server device 222, and a quorum device 224. Networks 208 and 212 may include web server devices 230 and 232, respectively. Network 210 may include a CP application server device 226 and a database server device 228.

CP application server device 220 may interact with incoming calls, park incoming calls, and/or route incoming calls toward agents in contact center 242 in customer network 214. In handling incoming calls, CP application server device 220 may track the status of incoming and parked calls via management of call queues. CP application server device 220 may interact with database server device 222 in managing the queues.

Database server device 222 may include a database of queues. Database server device 222 may receive and execute commands from CP application server device 220 to insert items into queues, delete items (e.g., an item that represents a call) from queues, obtain information about queues, etc. Depending on the implementation, database server device 222 may maintain multiple queues.

Quorum device 224 may include a voting device for a cluster 234. For cluster 234 to continue operating, a quorum (or a threshold number of nodes in the cluster) must be online and vote to continue running as a cluster. Although not a member of cluster 234, quorum device 224 may participate in cluster 234 to help in forming a quorum.

Web server device 230 may provide a user interface to CP application server device 220 and/or database server device 222. In one implementation, web server device 230 may provide a web interface for setting and querying different queue parameters (e.g., the maximum number of incoming calls that may be placed in a queue, an average number of calls in a queue, etc.).

CP application server device 226, database server device 228, and web server device 232 will come online when CP application server device 220, database server device 222, and web server device 230 become offline. When in operation, CP application server device 226, database server device 228, and web server device 232 will take the place of and will operate similarly to CP application server device 220, database server device 222, and web server device 230.

Similarly, CP application server device 220, database server device 222, and web server device 230 will come online when CP application server device 226, database server device 228, and web server device 232 become offline. When in operation, CP application server device 220, database server device 222, and web server device 230 will take the place of and will operate similarly to CP application server device 226, database server device 228, and web server device 232.

Customer network 214 may include one or more telephone networks and/or IP networks. Customer network 214 may include one or more of contact center 242. Contact center 242 may include an automatic call distributor (ACD)/IP Private Branch Exchange (PBX) 244, one or more agent phones 246, and one or more agent workstations 248. Although a typical contact center 242 includes many more agent phones and/or agent workstations, they are not illustrated in FIG. 2 for simplicity.

ACD/IP PBX 244 may switch an incoming call to one of agent phones 246. In addition, ACD/IP PBX 244 may communicate with a device(s) (e.g., CP application server device 220) in networks 206-212, to inform the device about call events (e.g., failed call) or receive instructions from the device. In some implementations, ACD/IP PBX 244 may modify its call distribution decisions based on input from networks 206-212.

Agent phone 246 may include a POTS type telephone or an IP phone (e.g., a soft phone). An agent in contact center 242 may assist a caller via agent phone 246.

Agent workstation 248 may include a personal computer, workstation, laptop, or another type of network device. Agent workstation 248 may receive instructions and/or data, from networks 206-212, and display the information to the agent. In some instances, the information may pertain to the caller and/or a transaction (e.g., a problem record, a problem ticket number, how many times the caller has called previously, etc.). In other instances, the information may pertain to the status of the agent (e.g., agent-not-ready status, to indicate that calls are no longer forwarded to the agent).

In FIG. 2, devices 220, 222, and 226-232 in networks 206-212 form a cluster 234. When a failover event occurs on one of CP application server device 220, database server device 222 and web server device 230, then CP application server device 220, database server device 222, and web server device 230 will fail over to CP application server device 226, database server device 228, and web server device 232, respectively. Similarly, when a failover event occurs to one of CP application server device 226, database server device 228, and web server device 232, then CP application server device 226, database server device 228, and web server device 232 will fail over to CP application server device 220, database server device 222, and web server device 230, respectively.

The number of devices and networks and the configuration in network 200 are exemplary and are provided for simplicity. In practice, according to other embodiments, network 200 may include additional devices, fewer devices, different devices, and/or differently arranged devices than those illustrated in FIG. 2. Additionally, according to another embodiment, network 200 may include additional networks, fewer networks, and/or differently arranged networks than those illustrated in FIG. 2.

Also, according to another embodiment, one or more functions and/or processes described as being performed by a particular device may be performed by a different device or a combination of devices. For example, according to one embodiment, a function or a process described as being performed by two or more devices may be performed by a single device. Conversely, according to another embodiment, a function or a process described as being performed by a single device may be performed by two or more devices or by a different device. For example, one or more functions and/or processes described as being performed by CP application server device 220 may be performed by database server device 222, or vice versa. Also, for example, CP application server device 220 may be combined with database server device 222, etc.

Figure 3:
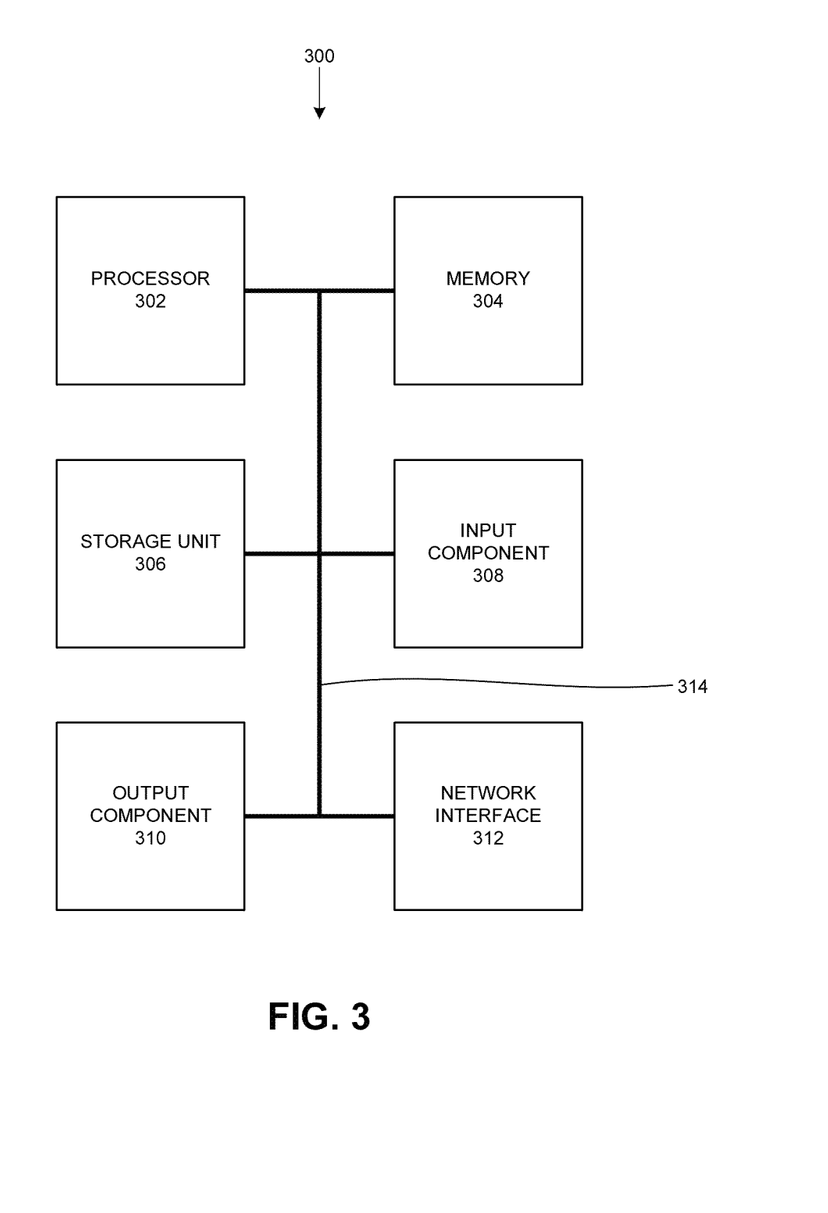
FIG. 3 is a block diagram of exemplary components of a network device of FIG. 2.

FIG. 3 is a block diagram of an exemplary network device 300, which may correspond to one or more of devices in FIGS. 1 and 2 (e.g., devices 220-232). As shown, network device 300 may include a processor 302, memory 304, storage unit 306, input component 308, output component 310, network interface 312, and communication path 314.

Processor 302 may include a processor, a microprocessor, an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

The exemplary configuration illustrated in FIG. 3 is provided for simplicity. Depending on the implementation, network device 300 may include more or fewer components than those illustrated in FIG. 3. In an exemplary implementation, network device 300 may perform operations in response to processor 302 executing sequences of instructions stored in a computer-readable medium, such as memory 304. As used herein, the terms "computer-readable medium" or "computer-readable storage device" may include a physical or logical memory device. The software instructions may be read into memory 304 from another computer-readable medium (e.g., a hard disk drive (HDD), SSD, etc.), or from another device via network interface 312. Alternatively, hardwired circuitry may be used in place of or in combination with software instructions to implement processes consistent with the implementations described herein.

Figure 4:
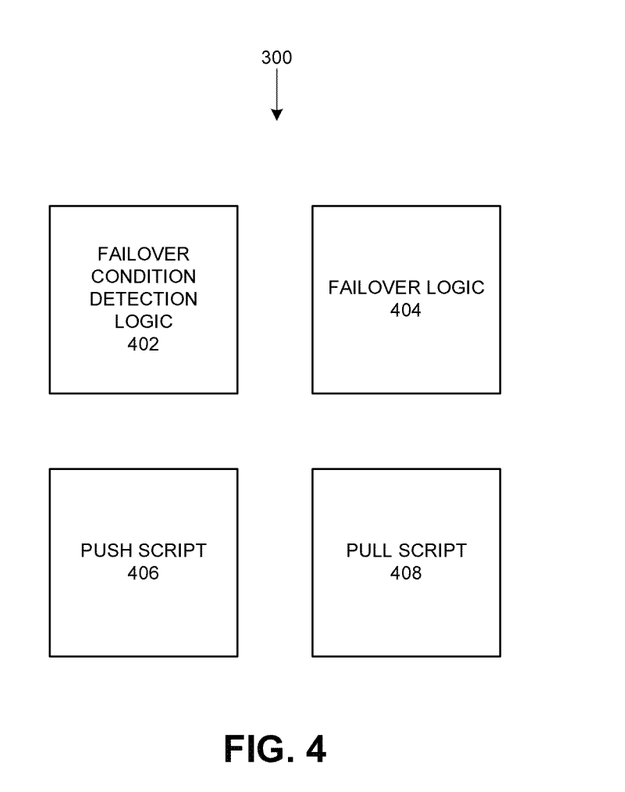
FIG. 4 is a block diagram of exemplary functional components of the network device of FIG. 3.

FIG. 4 is a block diagram of exemplary functional components of network device 300. It is assumed that network device 300 is a member of a cluster (e.g., cluster 234). As shown, network device 300 may include failover condition detection logic 402, failover logic 404, a push script 406, and/or a pull script 408. Although network device 300 may include other components (e.g., an operating system, a web server, a server application, etc.), for simplicity, they are not illustrated. Furthermore, depending on the implementation, network device 300 may include additional, fewer, different, or a different arrangement of components than those illustrated in FIG. 4.

Failover condition detection logic 402 may detect any device, network, and/or process conditions for failing over cluster 234. A failover condition may include a device/operator generated condition or a failure condition (e.g., a process failure or device failure). For example, failover condition detection logic 402 may detect a failure/termination of a specific server process or when a process hangs. In another example, failover condition detection logic 402 may detect multiple failures of a specific process (e.g., more than a threshold number of times). In yet another example, failover condition detection logic 402 may detect another device going down (e.g., via an operator intervention) or a failure of another device (e.g., due to a hardware failure). Failover condition detection logic 402 may also detect a failover condition when a certain process in network device 300 begins to execute. Upon detecting a failover condition, failover condition detection logic 402 may notify another component, such as failover logic 404.

Failover logic 404 may perform processes that are associated with failing over from a device(s) to another device(s). For example, when failover condition detection logic 402 notifies failover logic 404 of a failover condition, failover logic 404 may initiate a shutdown process for network device 300 as well as start running server processes on another device. In some implementations, failover logic 404 may perform push script 406 or pull script 408 when failover condition detection logic 402 detects a failover event.

Push script 406 may include instructions, for execution by network device 300, to fail over one or more devices to another device(s). In a sense, push script 406 "pushes" processes/services that are running on one set of devices onto another set of devices (i.e., failover devices). For example, assume network device 300 includes a CP application server device 220 and the failover device includes CP application server device 226. During a failover, CP application server device 220 executes push script 406, shuts down specific processes on CP application server device 220, and initiates the corresponding processes on CP application server device 226. That is, the execution of a push script figuratively may "push" the processes running on one set of devices to another set of devices. For example, the execution of push script 406 may push the failover processes from CP application server device 220 onto CP application server device 226.

Pull script 408 may include instructions, for execution by network device 300, to fail over one set of devices to another set of devices, which may include network device 300. In a sense, pull script 408 "pulls" processes/services that are running on a set of devices to another set of devices. For example, assume network device 300 includes queue manager 226 and a corresponding failover device includes CP application server device 220. During a failover, queue manager 226 executes pull script 408, shuts down specific processes on CP application server device 220, and initiates the corresponding processes on CP application server device 226. That is, the execution of a pull script figuratively may "pull" the processes running on one set of devices to another set of devices. For example, the execution of pull script 408 may pull the failover processes from CP application server device 220 onto CP application server device 226.

Figure 5A:
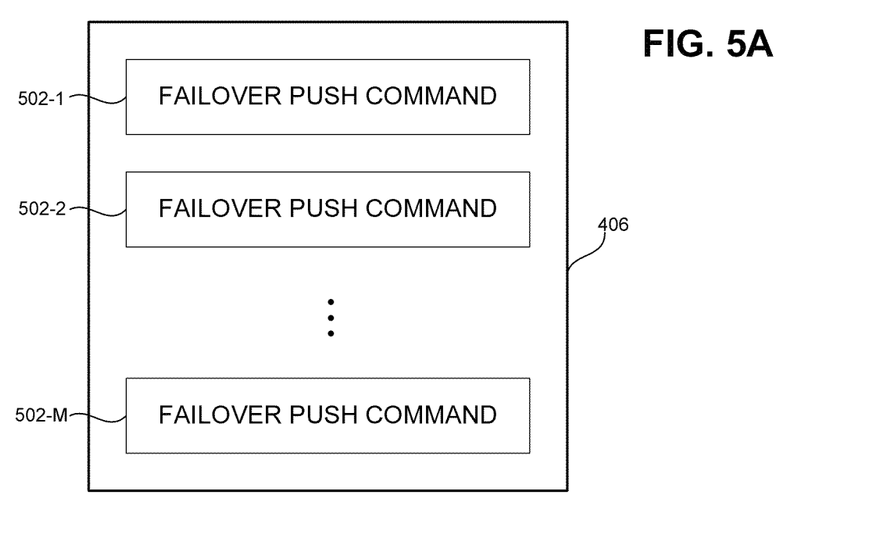
FIGS. 5A and 5B illustrate the push script of FIG. 4 and the pull script of FIG. 4, respectively.

FIG. 5A illustrates components of push script 406. As shown, push script 406 may include a series of failover push commands 502-1 through 502-M (collectively referred to as "push commands 502" and individually as "push command 502"). Each failover push command 502 may instruct a failover pair/group. For example, in FIG. 2, cluster 234 includes a failover pair of CP application server device 220 and queue manager 226. Failover push command 502 on CP application server device 220 may instruct the pair to complete the failover process (e.g., stop particular services on CP application server device 220 and start the corresponding services on CP application server device 226). In addition, push command 502 may instruct the other pairs to complete their failovers.

Figure 5B:
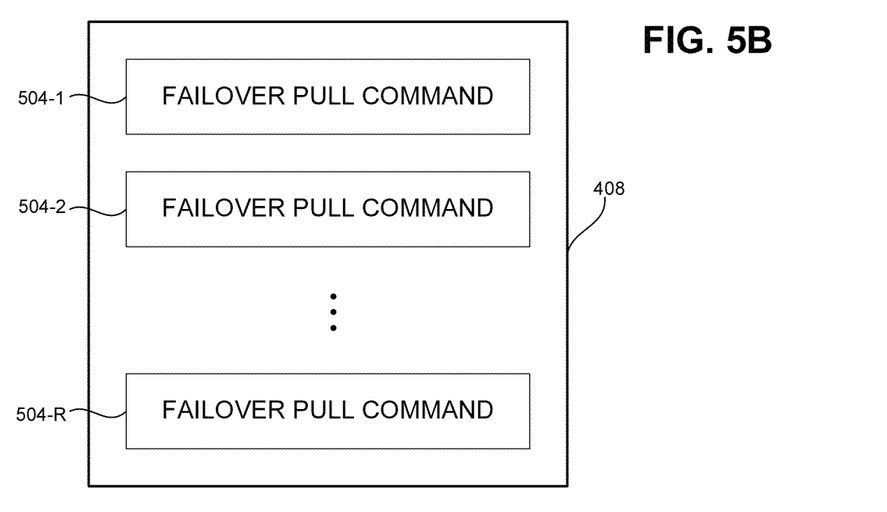

FIG. 5B illustrates components of pull script 408. As shown, pull script 408 may include a series of failover pull commands 504-1 through 504-R (collectively referred to as "pull commands 504" and individually as "pull command 504"). Each failover pull command 504 may instruct a failover pair/group to complete a failover process. For example, in FIG. 2, cluster 234 includes a failover pair of database server device 222 and database server device 228. Failover pull command 504 on database server device 228 may instruct the pair to complete the failover process (e.g., stop particular services on database server device 222 and start the corresponding services on database server device 228). In addition, pull command 504 may instruct the other pairs to complete their failovers.

Figure 6:
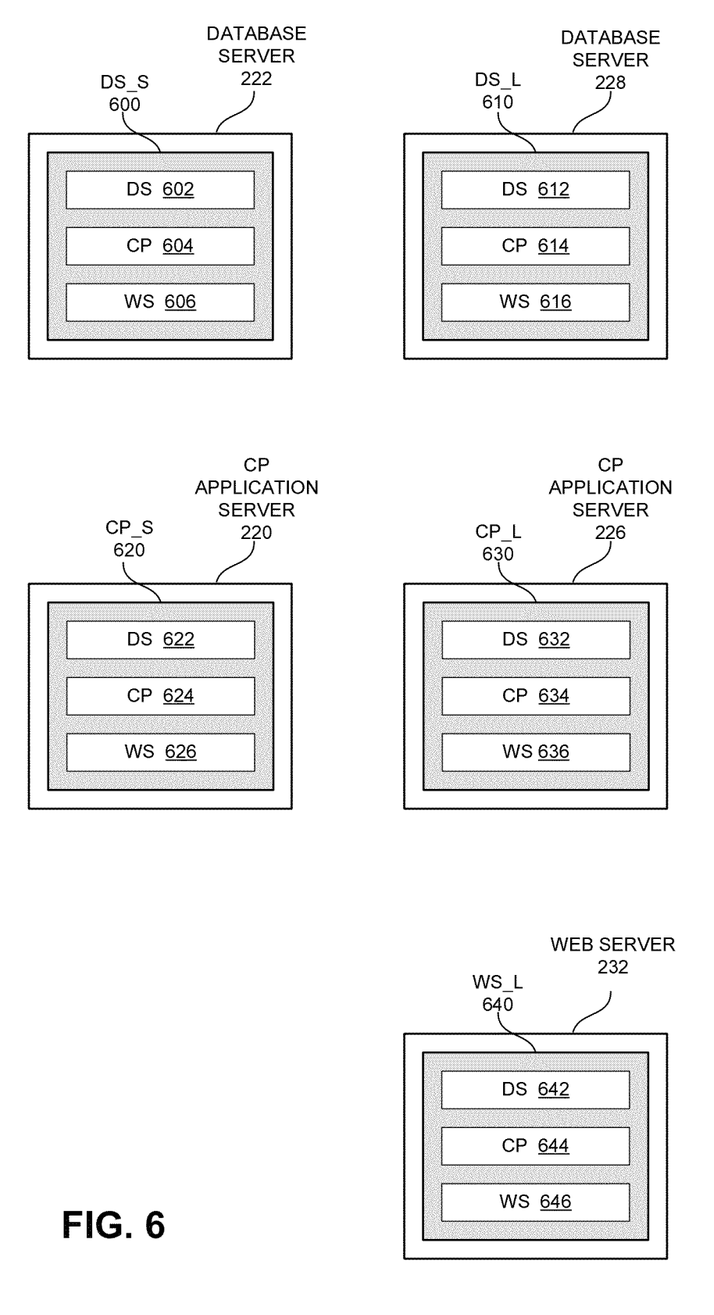
FIG. 6 illustrates exemplary pull scripts and push scripts in the database server device, CP application server device, and web server device of FIG. 2.

FIG. 6 illustrates exemplary pull scripts and push scripts on devices 220, 222, 226, 228, and 232 for failing over CP application server device 220, database server device 222, and web server device 230 to CP application server device 226, database server device 228, and web server device 232. Although devices 220-232 may include other failover scripts, for simplicity, FIG. 6 does not show such scripts. For example, FIG. 6 does not show push and pull scripts for failing over from database server device 228, CP application server device 226, and web server device 232 to database server device 222, CP application server device 220, and web server device 230, respectively.

As shown, database server device 222 includes push script 600 (DS_S 600), which in turn includes push commands DS 602, CP 604, and WS 606. DS 602 includes instructions for failing over database server device 222 to database server device 228. When DS 602 is executed by database server device 222, database server device 222 may cause database server device 222 to bring down processes running on database server device 222 and bring up the corresponding processes on database server device 228. Database server device 228 may execute its own script (i.e., DS_L 610) while coming up.

CP 604 includes instructions for failing over CP application server device 220 to CP application server device 226. When CP 604 is executed by database server device 222, database server device 222 may bring down CP application server device 220 and bring up CP application server device 226. CP application server devices 220 and 226 may execute their own scripts (i.e., CP_S 620 and CP_L 630) while CP application server device 220 is going down and CP application server device 226 is coming up, respectively.

WS 606 includes instructions for failing over web server device 230 to web server device 232. When WS 606 is executed by database server device 222, database server device 222 may bring down web server device 230 and bring up web server device 232. Web server device 232 may execute its own script (i.e., WS_L 640) while coming up. In the implementation illustrated in FIG. 6, web server device 230 may not include a script for pushing a failover.

As also shown, database server device 228 includes pull script 610 (DS_L 610), which in turn includes pull commands DS 612, CP 614, and WS 616. When each of commands CP 614 and WS 616 is executed by database server device 228, database server device 228 may cause CP application server device 220 to fail over to CP application server device 226 and web server device 230 to fail over to web server device 232, in a manner similar to that in which database server device 222 causes CP application server device 220 and web server device 230 to fail over. When DS 612 is executed by database server device 228, database server device 228 may cause database server device 222 to go down in an orderly fashion.

As further shown in FIG. 6, CP application server device 220 includes push script 620 (CP_S 620), which in turn includes push commands DS 622, CP 624, and WS 626. When each of commands DS 622 and WS 626 is executed by CP application server device 220, CP application server device 220 may cause database server device 222 and web server device 230 to fail over to database server device 228 and web server device 232, in a manner similar to that described for scripts 600 and 610. When CP application server device 220 executes CP 624, CP application server device 220 continues to bring down services running on CP application server device 220 (since it would already be going down as it is executing CP_S 620) and brings up CP application server device 226.

As further shown in FIG. 6, CP application server device 226 includes pull script 630 (CP_L 630), which in turn includes pull commands DS 632, CP 634, and WS 636. When each of commands DS 632 and WS 636 is executed by CP application server device 226, CP application server device 226 may cause database server device 222 and web server device 230 to fail over to database server device 228 and web server device 232, in a manner similar to that described for scripts 600, 610, and 620. When CP application server device 226 executes CP 634, CP application server device 226 brings down CP application server device 220 (if it is up) and continues to bring up services on CP application server device 226.

As still further shown in FIG. 6, web server device 232 includes pull script 640, (WS_L 640), which in turn includes pull commands DS 642, CP 644, and WS 646. When each of commands DS 642 and CP 644 is executed by web server device 232, web server device 232 may cause CP application server device 220 and database server device 222 to fail over to CP application server device 226 and database server device 228, in a manner similar to that described for scripts 600-630. In this implementation, however, web server device 230 may not include a push script. A push script for web server device 230 is unnecessary. Because device 232 detects and responds to a failover event so quickly, by the time the failover event occurs on web server device 230, device 232 will have initiated its pull script.

For scripts 600-640, because there are dependencies between devices 220, 222, and 230 and between 226, 228, and 232, it is important that failover commands in scripts 600-640 are performed in an order that results in a successful failover. For example, database server device 222 has to fail over (e.g., via the execution of DS 622 in CP_S 620) before CP application server device 220 fails over (via the execution of CP 624 in CP_S 620).

When a failover event that involves devices 220, 222, and 230 occurs, any of scripts 600-640 can execute first, depending on the event. Thereafter, other scripts 600-640 would follow. The specific order in which scripts 600-640 execute may depend on the specific failover event/condition.

Figure 7:
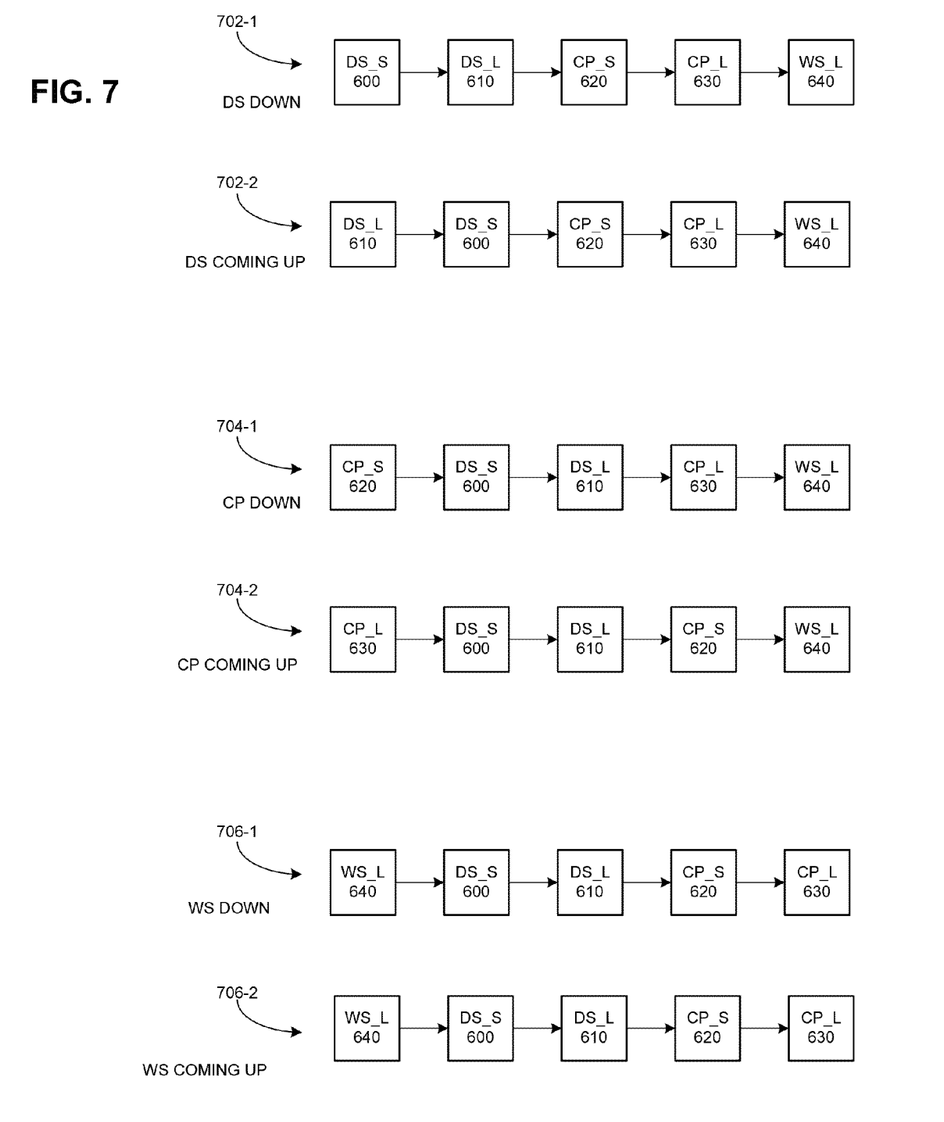
FIG. 7 illustrates exemplary execution of push and pull scripts in the devices of FIG. 2 under failover scenarios.

FIG. 7 illustrates exemplary executions of push and pull scripts in devices 220-232 under simple failover scenarios. For simplicity, other failover scenarios that may be more complex than those depicted in FIG. 7 are not illustrated. As shown, execution sequence 702-1, 704-1, or 706-1 is initiated when database server device 222, CP application server device 220, or web server device 230 goes down. Similarly, execution sequence 702-2, 704-2, or 706-2 is initiated when database server device 228, CP application server device 226, or web server device 232 comes up.

Execution sequence 702-1 begins with database server device 222 going down. As database server device 222 goes down, database server device 222 executes push script DS_S 600. When DS 602 command in DS_S 600 (FIG. 6) is executed, database server device 222 does nothing further, as it is already going down. Database server device 222 going down generates an event for bringing up database server device 228, which results in the execution of DS_L 610. DS_S 600 and/or DS_L 610 leads to failover of CP application server device 220 to 226. This involves the execution of CP_S 620, followed by CP_L 630. Furthermore, due to the failover of database server device 222 and CP application server device 220, web server device 230 fails over to web server device 232. When web server device 230 goes down, no script is executed (database server device 230 has no script to execute), and web server device 232 goes up, leading to the execution of WS_L 640. Although WS_L 640 includes commands for failing over database server device 222 and CP application server device 220, attempting to execute or executing the commands do not affect the cluster failover, since, by that time, database server device 222 and CP application server device 220 have already failed over.

Execution sequence 702-2 begins with database server device 228 coming up (e.g., due to an operator generated failover signal/event). Consequently, DS_L 610 for database server device 228 is executed, which in turn, leads to bringing down database server device 222 and the execution of DS_S 600. Thereafter, execution sequence 702-2 follows the same sequence of actions as 702-1 to fail over CP application server device 220 and web server device 230.

Execution sequence 704-1 begins with CP application server device 220 going down. As CP application server device 220 goes down, CP application server device 220 executes push script CP_S 620. When DS 622 command in CP_S 620 is executed, database server device 222 begins a failover, executing DS_S 600. Furthermore, as database server device 228 comes up, database server device 228 executes DS_L 610. Once the failover of database server device 222 to database server device 228 is complete, the failover of CP application server device 220 completes, with CP application server device 226 coming up and executing CP_L 630. Subsequently, web server device 230 fails over to database server device 232, leading to the execution of WS_L 640.

Execution sequence 704-2 begins with CP application server device 704-1 coming up (e.g., after detecting that CP application server device 220 crashed). This leads to the execution of CP_L 630 and, consequently, to a failover of database server device 222 to 228. Once the failover of database server device 222 to device 228 is complete, the failover of CP application server device 220 may resume. If CP application server device 220 is still up, CP_S 620 may be executed, followed by the failover of web server device 230 to device 232. If CP application server device 220 is down already, CP_S 620 is not executed.

Each of execution sequences 706-1 and 706-2 begins with web server device 230 going down and web server device 232 coming up. Since a failover script for web server device 232 is not available for execution, only the execution of WS_L 640 follows. Thereafter, failovers of database server device 222 and CP application server device 220 follow. As shown, the failovers entail the execution of push and pull scripts for database server devices 222 and 228 and CP application server devices 220 and 226.

Figure 8A:
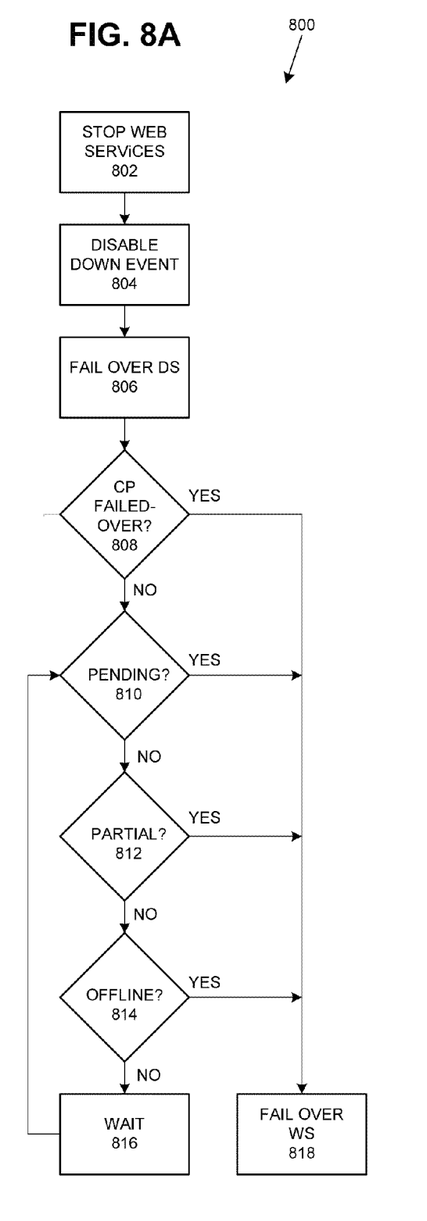
FIGS. 8A and 8B are flow diagrams illustrating exemplary processes that are associated with the push and pull scripts for the database server devices of FIG. 2.

FIG. 8A is a flow diagram illustrating an exemplary process 800 that is associated with a push script for database server device 222. As shown, process 800 may include database server device 222 stopping its own web services (block 802). More generally, each device in cluster 234 may stop only its own web services, to prevent improper communications with other devices in network 100.

Database server device 222 may disable certain tasks that are to be performed by CP application server device 220 (block 804). Such tasks may include folder synchronization tasks, reporting tasks, scheduled events for bringing down CP application server device 220, etc. If the tasks are not disabled, the tasks may fail and/or lead to additional events that cause failovers of cluster 234. To prevent the failover processes from continuing indefinitely, database server device 222 may disable the scheduled tasks.

Database server device 222 may invoke a cluster process to fail over to database server device 228 (block 806). Upon completion of the cluster command to fail over database server device 222, database server device 222 may determine whether CP application server device 220 has already failed over (block 808). If CP application server device 220 has already failed over (block 808: yes), database server device 222 may fail over web server device 230 to device 232 (block 818).

At block 808, if CP application server device 222 has not failed over (block 808: no), database server device 222 may perform a series of tests to determine the failover state of CP application server device 220. For example, at blocks 810, database server device 222 may determine whether CP application server device 220's failover state is "pending" (about to occur) (block 810) by, for example, querying CP application server device 220. If the state is "pending" (block 810: yes) process 800 may proceed to block 818. Otherwise (block 810: no), process 800 may proceed to block 812.

At block 812, database server device 222 may determine whether CP application server device 220's failover state is "partial" (the failover process for CP application server device 220 is not complete) (block 812). If the state is "partial" (block 812: yes), process 800 may proceed to block 818. Otherwise (block 812: no), process 800 may proceed to block 814.

At block 814, database server device 222 may determine whether CP application server device 220's failover state is "offline" (CP application server device 220 is down) (block 814). If the state is "offline" (block 814: yes), process 800 may proceed to block 818. Otherwise (block 814: no), process 800 may proceed to block 816.

At block 816, database server device 222 may attempt to fail over CP application server device 220, wait for the failover process for CP application server device 220/proceed further, and return to block 810. At block 810, database server device 222 may retest the failover state of CP application server device 220.

Figure 8B:
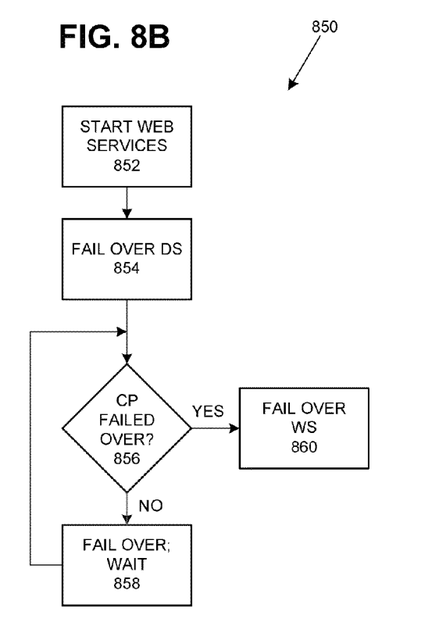

FIG. 8B is a flow diagram illustrating an exemplary process 850 that is associated with a pull script for database server device 228. As shown, process 850 may include database server device 228 starting any web servers (block 852).

Database server device 228 may complete the failover of database server device 222 to 228 (block 854). That is, database server device 228 may attempt to bring down database server device 222 and proceed to the completion of the failover. Thereafter, database server device 228 may determine whether CP application server device 220 failed over (block 858). If CP application server device 220 has failed over to CP application server device 226 (block 856: yes), database server device 228 may then fail over web server device (block 860). Otherwise (block 856: no), database server device 228 may attempt to fail over CP application server device 220 (block 858), wait (block 858), and then return to bock 856.

Figure 9A:
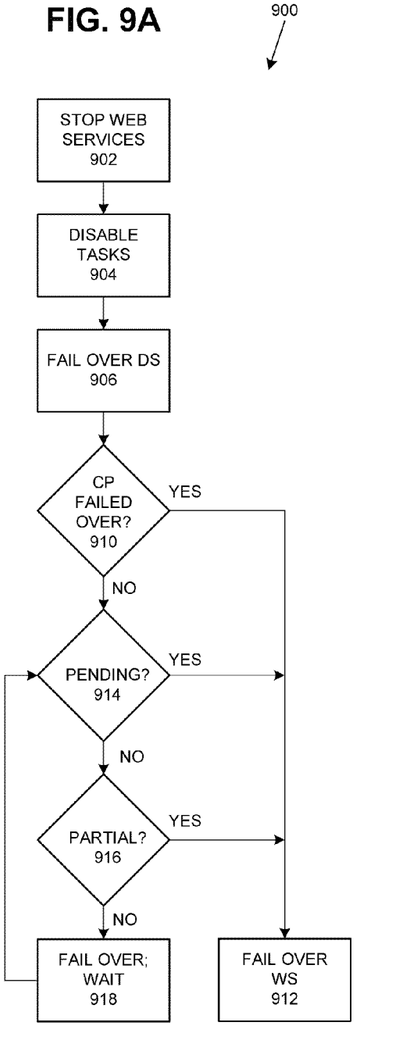
FIGS. 9A and 9B are flow diagrams illustrating exemplary processes that are associated with the push and pull scripts for the call processing (CP) application server device of FIG. 2.

FIG. 9A is a flow diagram illustrating an exemplary process 900 that is associated with a push script for CP application server device 220. As shown, process 900 is similar to process 800 described above with respect to FIG. 8A. Blocks 902, 904, 906, 910, 912, 914, 916, and 918 correspond to blocks 802, 804, 806, 808, 818, 810, 812, and 816. Process 900 does not include a block that corresponds to block 814.

The actions of the blocks in FIG. 9A are similar to those of the corresponding blocks in FIG. 8A. However, in FIG. 9A, the actions associated with each of the blocks are initiated at CP application server device 220, rather than at database server device 222.

Figure 9B:
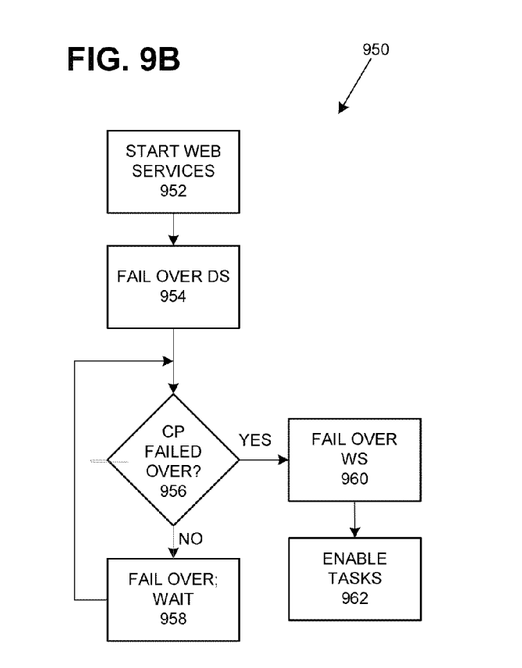

FIG. 9B is a flow diagram illustrating an exemplary process 950 that is associated with a pull script for CP application server device 226. As shown, process 950 is similar to process 850 described above with respect to FIG. 8B. Blocks 952, 954, 956, 958, and 960 correspond to blocks 852, 854, 856, 858, and 860. Process 950 includes a 962, for which process 850 does not include a corresponding block.

The actions of the blocks in FIG. 9B are similar to those of the corresponding blocks in FIG. 8B. However, in FIG. 9B, the actions associated with each of the blocks are initiated at CP application server device 226, rather than at database server device 228. Block 962 in process 950 re-enables tasks that were disabled at block 904 (or at block 804).

Figure 10:
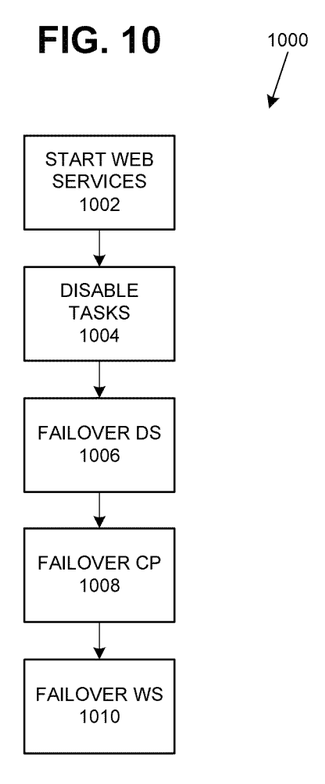
FIG. 10 is a flow diagram illustrating an exemplary process that is associated with the pull script for the web server device of FIG. 2.

FIG. 10 is a flow diagram that illustrates an exemplary process 1000 associated with the pull script for web server device 232. As shown, process 1000 includes web server device 232 starting its own web services (block 1002). Thereafter, process 1000 fails over database server device 222 to database server device 228, CP application server device 220 to CP application server device 226, and web server device 230 to web server device 232. Each of the actions of process 1000 is initiated by web server device 232.

In FIGS. 6, 7, 8A, 8B, 9A, 9B, and 10, many of push and pull scripts include the same or similar failover commands. One reason for having duplicate failover commands is that it is possible for multiple devices to fail. For example, it is possible that database server device 222, CP application server device 220, and web server device 230 fail about the same time, for example, due to a power outage or a network outage. In such a case, database server device 228, CP application server device 226, and web server device 232 need to perform the correct failover sequence. Redundancy of the commands ensures that cluster 234 fails over correctly.

As described above, any of processes 800, 850, 900, 950, and 1000 may initiate another process 800, 850, 900, 950, and 1000. This can lead to a complicated execution sequence in which multiple scripts attempt to fail over the same devices. However, most of the failover actions in the processes may be re-executed (or attempted to be re-executed) without adversely affecting the overall failover process.

As described above, cluster 234 may provide for a failover of multiple devices. The multiple devices may provide for one or more interdependent application service(s) that must failover as a whole. Each of the devices may initiate cluster 234 failover under different scenarios. For example, in one scenario, a process running on CP application server device 220 may fail. In another scenario, a server device may be brought down by a network administrator. In each of these instances, one or more of the devices in cluster 234 may initiate a cluster failover. In failing over cluster 234, each of the devices may sequence individual device failovers, as well as control the timing of the failovers. Without the correct sequencing and/or the timing, the failover may not be performed correctly.

In the above description, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to an exemplary process illustrated in FIGS. 8A, 8B, 9A, 9B, and 10, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
a first device, in a cluster, configured to:
fail over the first device to a first failover device in the cluster by pushing a first process on the first device to the first failover device when a first failover event occurs; and
fail over a second device to a second failover device after failing over the first device to the first failover device;
the first failover device configured to:
fail over the first device to the first failover device by pulling the first process on the first device to the first failover device when a second failover event occurs; and
fail over the second device to the second failover device after failing over the first device to the first failover device when the second failover event occurs;
the second device, in the cluster, configured to:
fail over the first device to the first failover device when the first failover event occurs; and
fail over the second device to the second failover device by pushing a second process on the second device to the second failover device after failing over the first device to the first failover device when the first failover event occurs; and
the second failover device, in the cluster, configured to:
fail over the first device to the first failover device when the second failover event occurs; and
fail over the second device to the second failover device by pulling the second process on the second device to the second failover device after failing over the first device to the first failover device when the second failover event occurs.

2. The system of claim 1, further comprising:
a third device, in the cluster, configured to:
fail over the first device to the first failover device when the first failover event occurs;

fail over the second device to the second failover device after failing over the first device to the first failover device when the first failover event occurs;

fail over the third device to a third failover device in the cluster by pushing a third processes on the third device to the third failover device after failing over the second device to the second failover device and the first device to the first failover device when the first failover event occurs; and the third failover device, in the cluster, configured to:

fail over the first device to the first failover device when the second failover event occurs;

fail over the second device to the second failover device after failing over the first device to the first failover device when the second failover event occurs; and fail over the third device to the third failover device by pulling the third process on the third device to the third failover device after failing over the second device to the second failover device and failing over the first device to the first failover device when the second failover event Occurs.

3. The system of claim 2, wherein the first device is further configured to failover the third device to the third failover device after failing over the second device to the second failover device and failing over the first device to the first failover device when the first failover event occurs, wherein the first failover device is further configured to failover the third device to the third failover device after failing over the second device to the second failover device and failing over the first device to the first failover device when the second failover event occurs, wherein the second device is further configured to failover the third device to the third failover device after failing over the second device to the second failover device and failing over the first device to the first failover device when the first failover event occurs, and wherein the second failover device is further configured to failover the third device to the third failover device after failing over the second device to the second failover device and failing over the first device to the first failover device when the second failover event occurs.

4. The system of claim 2, wherein the first process, the second process, and the third process are interdependent on one another.

5. The system of claim 1, wherein when the first device pushes the first process, the first device is configured to execute a push script, and wherein when the first failover device pulls the first process, the failover device is configured to execute a pull script.

6. The system of claim 5, wherein the push script includes same cluster commands as the pull scripts.

7. The system of claim 5, wherein when the first device executes the pull script, the first device terminates the first process on the first device and brings up a process, which corresponds to the first process, on the first failover device.

8. The system of claim 5, wherein the push script includes a command to disable one or more devices from responding to additional failover events resulting from failing over the first device to the first failover device and the second device to the second failover device.

9. The system of claim 1, wherein the first failover event includes a failure event.

10. The system of claim 9, wherein the failure event includes at least one of:

a failure of the second device;

a failure of a hardware component of the first device;

a failure of a process; or a number of failures of a process, wherein the number exceeds a threshold.

11. The system of claim 1, wherein the first failover event includes:

an orderly shutdown of the first device or the second device.

12. The system of claim 1, further comprising:

a database configured to failover, when the first failover event occurs, from one host to another host.

13. The system of claim 1, wherein the first device includes a device for routing incoming calls, and wherein the second device includes a device for updating and providing information about call queues in accordance with communications with the first device.

14. One or more non-transitory computer-readable media including:

first failover push instructions, when executed by a first device, causes:

the first device to fail over to a first failover device by pushing a first process on the first device to the first failover device when a first failover event occurs, and a second device to fail over to a second failover device after the first device fails over to the first failover device;

first failover pull instructions, when executed by the first failover device, causes:

the first device to fail over to the first failover device by pulling the first process on the first device to the first failover device when a second failover event occurs, and the second device to fail over to the second failover device after the first device fails over to the first failover device when the second failover event occurs;

second failover push instructions, when executed by the second device, causes:

the first device to fail over to the first failover device when the first failover event occurs, and the second device to fail over to the second failover device by pushing a second process on the second device to the second failover device when the first failover event occurs; and second failover pull instructions, when executed by the second failover device, causes:

the first device to fail over to the first failover device when the second failover event occurs, and the second device to fail over to the second failover device by pulling the second process on the second device to the second failover device when the second failover event occurs.

15. The one or more non-transitory computer-readable media of claim 14, wherein the first push failover instructions include a script or batch commands.

16. The one or more non-transitory computer-readable media of claim 14, further comprising instructions for failing over the first failover device to the first device when a third failover event occurs.

17. The one or more non-transitory computer-readable media of claim 14, wherein the first device, the first failover device, the second device, and the second failover device belong to a cluster.

18. The one or more non-transitory computer-readable media of claim 14, wherein when the first device executes the first instruction, the first device terminates the first process running on the first device and brings up a third process, for performing similar functions as the first process, on the first failover device.

19. The one or more non-transitory computer-readable media of claim 14, wherein the first failover push instructions further comprise a command to disable one or more devices from responding to additional failover events resulting from failing over the first device to the first failover device and failing over the second device to the second failover device.

20. A method comprising:

failing over, by a first device in a cluster, the first device to a first failover device in the cluster by pushing a first process on the first device to the first failover device when a first failover event occurs;

failing over, by the first device, a second device in the cluster to a second failover device after failing over the first device to the first failover device;

failing over, by the first failover device, the first device to the first failover device by pulling the first process on the first device to the first failover device when a second failover event occurs;

failing over, by the first failover device, the second device to the second failover device after failing over the first device to the first failover device when the second failover event occurs;

failing over, by the second device, the first device to the first failover device when the first failover event occurs;

failing over, by the second device, the second device to the second failover device by pushing a second process on the second device to the second failover device after failing over the first device to the first failover device when the first failover event occurs;

failing over, by the second failover device, the first device to the first failover device when the second failover event occurs; and failing over, by the second failover device, the second device to the second failover device by pulling the second process on the second device to the second failover device after failing over the first device to the first failover device when the second failover event occurs.

* * * * *